United States Patent [19]

Ranta

[11] Patent Number: 4,847,957
[45] Date of Patent: Jul. 18, 1989

[54] MULTI-PURPOSE CLASP

[76] Inventor: Olavi A. Ranta, Mäkitorpantie 22 A, SF-00640, Helsinki 64, Finland

[21] Appl. No.: 127,667

[22] PCT Filed: Mar. 5, 1987

[86] PCT No.: PCT/FI87/00030

§ 371 Date: Nov. 5, 1987

§ 102(e) Date: Nov. 5, 1987

[87] PCT Pub. No.: WO87/05193

PCT Pub. Date: Sep. 11, 1987

[30] Foreign Application Priority Data

Mar. 5, 1986 [FI] Finland ................................. 860919

[51] Int. Cl.⁴ ............................................ A44B 13/02
[52] U.S. Cl. ........................................... 24/237; 24/546
[58] Field of Search ............. 24/237, 236, 239, 283, 24/30.5 T, 30.5 S, 20 S, 16 R, 17 R, 67.9, 546, 543

[56] References Cited

U.S. PATENT DOCUMENTS

| | | | |
|---|---|---|---|
| 1,440,628 | 1/1923 | Raub | 24/237 |
| 1,472,766 | 10/1923 | Fraser | 24/237 |
| 1,619,783 | 3/1927 | Chase | 24/237 |
| 2,050,757 | 8/1936 | Leon | 24/236 |
| 3,234,616 | 2/1966 | Wantland | 24/237 |
| 3,335,472 | 8/1967 | Shigemi Imai | 24/237 |
| 3,604,066 | 9/1971 | Moon | 24/543 |
| 3,750,240 | 8/1973 | Fridrich | 24/237 |

Primary Examiner—Victor N. Sakran
Attorney, Agent, or Firm—Arnold, White & Durkee

[57] ABSTRACT

A multi-purpose clasp designed to be used as an universal clasp of jewelry, ornament chains, key chains, fishing lines and the like. The clasp is one-piece in structure, comprising a locking bow (1), a spiral neck (2) and a connection ring (3); in its simplest embodiment it is open-jointed, and in its further developed embodiment it comprises a parallel connection. At the locking stage, a point portion (1') of the locking bow (1) of the clasp of the simplest embodiment is positioned within the connection ring (3) so as to be protected from catching external objects and so that it partly covers the open joint of the connection ring (3); in the further developed form, a hook-shaped tip (1") of the locking bow (1) is pressed within a bent end portion (3") of the connection ring (3) to be protected from catching, so that it simultaneously locks the connection ring (3), closes the connection opening (3') and secures the locking of the locking bow (1). Since the manufacture of the clasp can be effected without any heat treatment and the attachment to the object can be made without soldering, the clasp can be made of any resilient material resistant to bending.

3 Claims, 2 Drawing Sheets

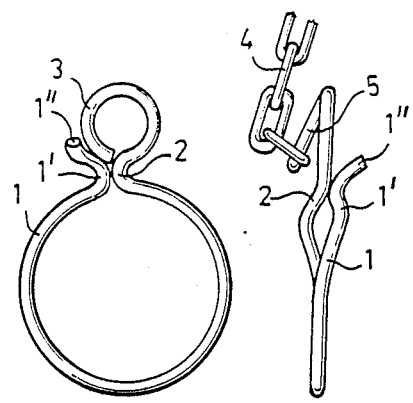
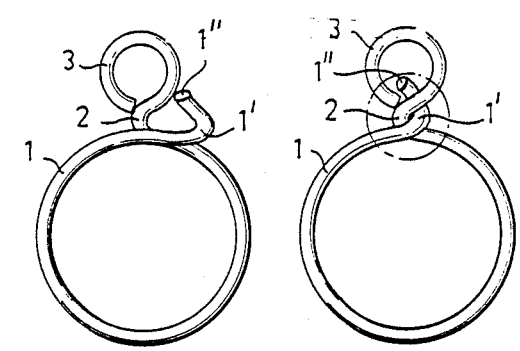
FIG. 1   FIG. 1a   FIG. 1b   FIG. 1c
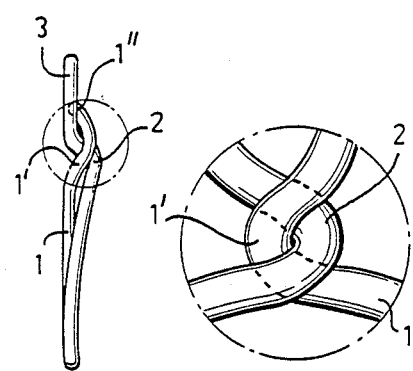
FIG. 2   FIG. 2a   FIG. 2b   FIG. 2c
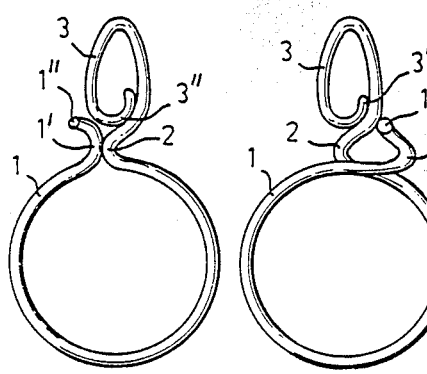
FIG. 3   FIG. 3a   FIG. 3b   FIG. 3c

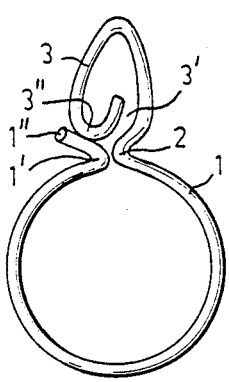
FIG.4
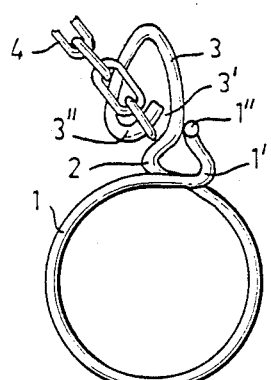
FIG.4a
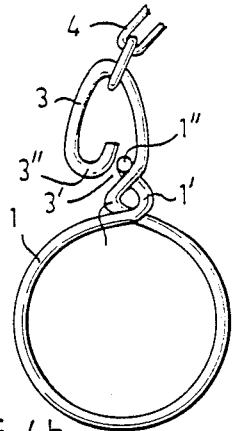
FIG.4b
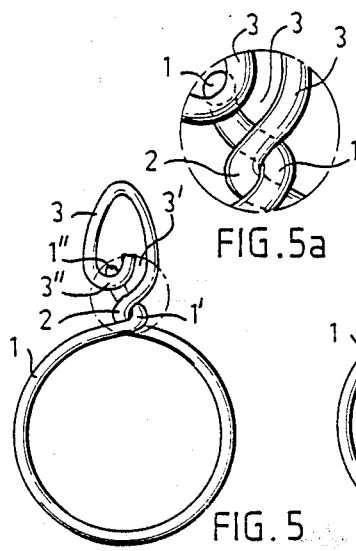
FIG.5  FIG.5a
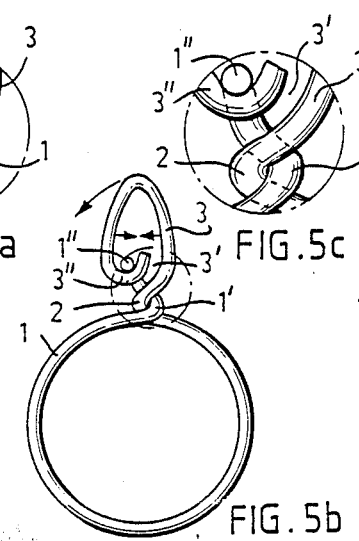
FIG.5b  FIG.5c
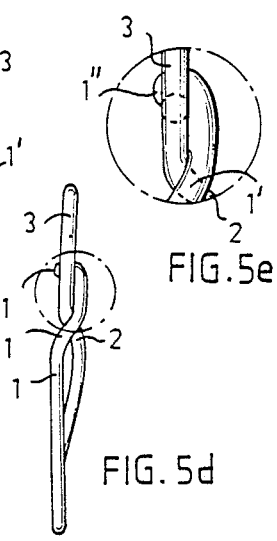
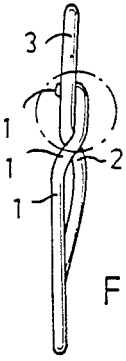
FIG.5d  FIG.5e
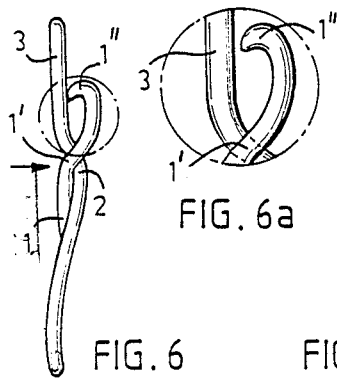
FIG.6  FIG.6a
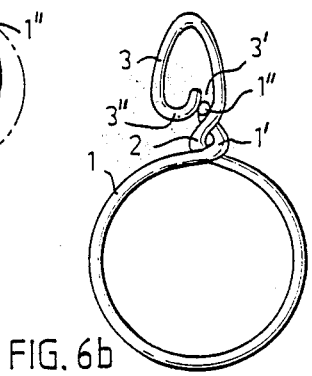
FIG.6b
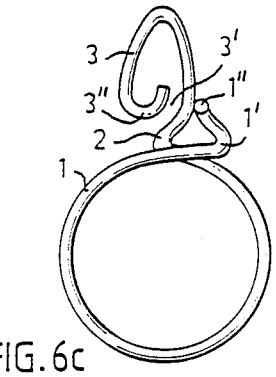
FIG.6c

MULTI-PURPOSE CLASP

The invention relates to a multi-purpose clasp for ornament chains, key chains and fishing lines as well as for purposes in which the lock has to have a neat appearance, reliable locking, and easy operation, which lock can be made of any resilient material resistant to bending in such a way that it is one-piece in structure and comprises a locking bow, a spiral neck and a connection ring.

The most generally known locking means for ornament chains is a spring ring lock; besides, various kinds of other spring locks (carabine locks), hook means etc. as ornament chain clasps, dubble-spiral rings, mechanical lever-arm and the like key rings are generally used as locking means. However, none of known locking means is comparable to the multi-purpose clasp according to the invention in terms of the locking function, easy operation and structural solutions, nor has any suggestion of the solution according to the invention been found in the literature.

Even though the spring ring lock is world-widely the best-known and most generally used clasp for ornament and jewelry chains, it is nevertheless the least reliable. Having thin walls and open joints and being softened by the soldering of the connection ring, the tubular ring is easily distorted so that the locking tongue is not maintained in position but is passed out of the locking house, the spiral spring positioned within the ring gets stuck within the tube, if even a small amount of soap-containing wash water gets within the spring and dries therein, with the result that the locking tongue is stuck in place. Disturbances in the operation of carabine locks, which have a more durable structure, are mainly due to the fact that the spiral ring may become rusty or stick fast. A disadvantage of the above-mentioned locks as well as some other locks relatively rare in use is that they comprise projecting parts which easily catch external objects and that they are stiff or cumbersome in use and expensive.

By means of the multi-purpose clasp according to the invention a decisive improvement is achieved in the above disadvantages, because the clasp can be made of a variety of resilient materials resistant to bending and tested before the commencement of the manufacture. Furthermore, the manufacturing stage as well as the attachment of the clasp to the object can be carried out without any heat treatment deteriorating the resilience of the materials. Also, the clasp does not comprise any springs which would easily rust or get stuck or any other separate parts disadvantageous for the operation. Being entirely made of one and the same material piece, the clasp can be connected from the connection ring so that it resists the required pulling strain. The holding properties of the multi-purpose clasp are also superior, because the holding properties of the locking bow get better with an increase in the pulling force exerted on the clasp, and the clasp does not comprise any projecting parts which might catch external objects, such as hairs, knitted garments, stockings and the like. The manufacturing costs are also advantageous, because the clasp can be entirely manufactured by a bending method, and since no raw material is wasted, the price of the lock is low.

For the achievement of this object, the invention is characterized by the features disclosed in the characterizing portion of claim 1. The most important advantage of the invention over the prior art is that no heat treatment is required for the manufacture of the clasp nor for the reliable attachment thereof to a chain, so that the resilience and the bending strength of the lock remain such as they are defined before the commencement of the manufacture; that the clasps can be made by bending a certain length of thread material into an operative clasp body without any material wastes; that the clasp can be attached to a chain or the like so reliably that it can be compared to the connection between closed rings; that the clasp is not only easy to be locked and released but it also provides an absolutely reliable holding effect; and that the lock does not have any projections that could catch external objects, such as hairs, knitted garments, stockings and the like.

In the following a few embodiments of the multipurpose clasp according to the invention will be described in more detail with reference to the attached drawing, wherein FIG. 1 is a front view of the first embodiment of the multi-purpose clasp according to the invention in an initial position in which a locking bow 1 closes the passage into and away from within the bow in a resiliently yielding manner;

FIG. 1a is a side view of the clasp when turned counter-clockwise. The figure shows the initial position of the locking bow 1; the outwardly directed position of a locking point 1" facilitating the attachment; and the initial stage of the passing of a chain 4 within a connection ring.

FIG. 1b is a front view of the clasp at a locking stage when the locking point 1" has been passed past the connection ring 3 so that it is in a closing position against the body.

FIG. 1c is a front view of the clasp in a locking position. The figure shows the tight attachment of a locking spiral 1' to a spiral neck 2 and the position of the locking point 1" within the connection ring 3 so that it is protected from catching, and the partial covering of the open joint of said ring by means of the locking point so that it does not catch external objects;

FIG. 2 is a side view of the clasp in the locking position shown in FIG. 1c when turned in the clockwise direction. The figure shows the protected position of the locking point 1" within the connection ring 3;

FIG. 2a illustrates the attachment of the locking spiral 1' to the spiral neck 2 at the locking stage;

FIG. 2b is a partial enlarged view of the locking stage of FIG. 2; the figure shows a small clearance above and below the point of attachment, by virtue of which the attachment can be made and released easily without locking effect;

FIG. 2c is a back view of the clasp in the locking position. Compare to FIG. 1c seen from the opposite side;

FIG. 3 is a front view of the second embodiment of the clasp according to the invention in the same initial position as shown in FIG. 1;

FIG. 3a illustrates the clasp at the same locking stage as shown in FIG. 1b;

FIG. 3b illustrates a locking stage in which the locking spiral 1' is tightly attached to the spiral neck 2, the hook-shaped locking point 1" being positioned upon the body of a bent end portion 3";

FIG. 3c illustrates the clasp in the final secured locking position, in which the locking point 1" is inserted within the bent end portion 3" to be protected from catching. At this stage the locking point 1" has locked the connection ring 3" and secured the locking of the locking bow 1;

FIG. 4 is a front view of the third embodiment of the multi-purpose clasp according to the invention in the same initial position as shown in FIGS. 1 and 3;

FIG. 4a illustrates the clasp at the same stage as shown in FIGS. 1b and 3a. This figure also illustrates the importance of a connection opening 3' when the clasp is attached to a chain 4 having a rather great thickness;

FIG. 4b illustrates the lock at a stage when the locking point 1" closes the connection opening 3' so that the locking bow 1 is in a secondary locking position;

FIG. 5 illustrates a locking stage at which the locking spiral 1' is tightly attached to the spiral neck 2 and the locking point 1" is positioned on the body of the bent end portion 3";

FIG. 5a illustrates the locking stage shown in FIG. 5 on an enlarged scale;

FIG. 5b illustrates the clasp in the final secured locking position, in which the locking point 1" has been pressed within the bent end portion 3" to be protected from catching. At this stage the locking point 1" has locked the connection ring 3, closed the connection opening 3' and secured the locking bow 1 in place;

FIG. 5c is partial enlarged view of the secured locking position of FIG. 5b;

FIG. 5d is a side view of the secured locking position of FIG. 5b when the clasp has been turned clockwise;

FIG. 5e is a partial enlarged view of the secured locking position shown in the preceding figure;

FIG. 6 illustrates the releasing of the hookshaped locking point 1" from the bent end portion 3" when the clasp is being released from the secured locking position, at which stage the clasp is simultaneously bent in the direction indicated by the arrow;

FIG. 6a is a partial enlarged view of the locking point 1" of the clasp when released from the secured locking position within the bent end portion 3";

FIG. 6b illustrates the secondary locking stage of the locking bow 1 when it is being released from the locking position.

FIG. 6c illustrates the final stage of the releasing of the locking bow 1 from the locking position, whereafter the locking bow is passed into the initial position.

The most simple embodiment of the multi-purpose clasp shown in FIGS. 1, 1a, 1b, 1c, 2, 2a, 2b and 2c has a two-stage locking process, comprising a pre-locking or a secondary locking and a secured locking. In FIG. 1, the clasp is shown in the initial position, the locking point 1" being pressed against the body of the connection ring 3. When the object to be attached to the clasp is passed within the locking bow 1 through the resiliently yielding locking point 1", the object is prelocked to the final locking object, at which stage, i.e. before the locking bow 1 is secured in the final locking position, it is possible to check whether the passing within the locking bow has been carried out properly.

FIG. 1a illustrates the way of attachment of the chain 4 to the connection ring 3 in the simplest embodiment, which attachment is effected by opening and closing the connection ring 3 by means of pliers.

FIG. 1b shows the clasp at an intermediate stage between the pre-locking position and the secured locking position, at which stage the locking bow has been pressed between fingers so that the clasping point 1" has passed past the connection ring 3, bearing on the body of the connection ring in a retaining position, wherefrom the point portion 1" of the locking bow 1 is pressed behind the connection ring 3, simultaneously bending the body of the clasp, if necessary, so that the locking spiral 1' is immediately attached to the spiral neck 2 due to the yielding of the locking bow 1, the locking point 1" being simultaneously positioned within the connection ring 3 so that it partly protects the open joint of the connection ring from catching external objects.

FIG. 1c is a front view of the clasp in the final secured locking position; FIG. 2 is a side view of the clasp when turned clockwise with respect to the preceding figure; and FIG. 2c is a back view thereof. The final locking stage after FIG. 1b appears from these figures. FIGS. 2a and 2b are a front and a side view respectively of the locking attachment of the locking spiral 1' and the spiral neck 2 on an enlarged scale.

The multi-purpose clasp provided with a connection ring 3 according to the simplest embodiment is released from the locking in such a manner that while pressing the locking bow 1, the locking point 1" is displaced outside the connection ring 3 in front of it to the initial position of the clasp, so that the object clasped within the locking bow 1 can be released through the resiliently yielding point 1" of the locking bow 1.

The basic structure of the second embodiment of the multi-purpose clasp shown in FIGS. 3, 3a, 3b and 3c differs from the structure of the first embodiment mainly with respect to the connection ring 3; however, this structural change provides decisive changes in the attachment, locking stages and secured locking of the clasp. The connection ring 3 of the clasp according to the second embodiment ends in the bent end portion 3" within the ring, so that it at the same time forms a parallel connection deviating from the open-joint connection, which parallel connection enables the locking of the connection ring 3 to be carried out simultaneously as the locking bow is secured to the locking position. The embodiments of FIGS. 3 and 3a correspond to the embodiments shown in FIGS. 1 and 1b; in FIG. 3c, the locking spiral 1' is tightly attached to the spiral neck, and the hook-shaped locking point 1" is positioned on the body of the bent end portion 3". In FIG. 3c, the locking point 1" is pressed within the bent end portion 3" so that it is protected from catching, at which stage the connection ring 3 is locked and the locking bow 1 is secured in the locking position.

The basic structure of the third embodiment of the multi-purpose clasp shown in FIGS. 4, 4a, 4b, 5, 5a, 5b, 5c, 5d, 5e, 6, 6a, 6b and 6c is similar to that of the preceding embodiments; neither the locking nor the releasing differ with respect to the stage shown in FIG. 4a and the stages effected in front of the clasp. The body of the connection ring 3, which body in this clasp ends in the bent end portion within the ring 3", as shown in FIG. 4 and similarly as in the second embodiment shown in FIG. 3, differs only in that a so-called connection opening 3' is defined between the body of the connection ring 3 according to this third embodiment and the bent end portion 3", which opening is visible in FIG. 4. The connection opening 3' enables the clasp to be attached even to a fairly thick chain in a manner shown in FIG. 4a without the use of pliers. When the locking point 1" closes the connection opening 3' in a manner shown in FIG. 4b, the locking bow 1 is in the safety or secondary locking position. This locking stage is of importance when the passing into the secured locking is not completed for some reason. Even though the locking bow is able to move in the longitudinal direction of the clasp, the clasp cannot be detached from the chain, because the locking point 1" closes the connection opening so that the locking bow cannot open.

In FIG. 5 the locking spiral 1' is tightly attached to the spiral neck 2, being thus locked with the locking point 1" positioned on the body of the bent end portion. FIG. 5a is an enlarged view of this stage.

The secured locking position, in which the connection ring 5 is locked, the connection opening 3' is closed, and the locking bow 1 is secured in the locking position, is obtained as shown in FIG. 5b in such a manner that the connection ring 3 is pressed between fingers in the inward direction indicated by the arrows, simultaneously bending the connection ring 3 in the direction of the curved arrow, so that the locking point 1" is pressed within the bent end portion 3" to a locking position in which it is protected from catching. The resilience of the connection ring 3 enables the deeply bent locking point 1" to be passed within the bent end portion 3", by virtue of which the present third embodiment of the multi-purpose clasp can be considered to be completely safe even for valuable jewelry. FIG. 5c shows the final stage of the locking on an enlarged scale, FIG. 5d shows the same final stage in a side view when the clasp has been turned clockwise, and FIG. 5e shows a partial enlarged view of the locking stage.

In order that the locking bow 1 could be detached from the secured locking position, the locking point 1" is released from within the bent end portion 3", which requires the same pressing and bending steps as shown in FIG. 5b illustrating the passing of the locking point 1" within the bent end portion 3" at the locking stage, and further, the body of the clasp has to be bent in the direction of the arrow of FIG. 6 so that the locking point 1" springs out from within the bent end portion 3". FIG. 6a is a partial enlarged view of the locking point 1" sprung out from within the bent end portion 3". FIGS. 6b and 6c illustrate the stages for releasing the locking bow 1 through the safety locking and outside the connection ring 3 to the initial position.

I claim:

1. A multi-purpose clasp designed to be used as an universal clasp for jewelry, ornament chains, key chains, fishing lines and the like, which clasp is made by bending a resilient thread material resistant to bending so that the clasp, which is one-piece in structure, comprises a locking bow (1), a spiral neck (2) and a connection ring (3), characterized in that the open-joint connection ring (3) and the resiliently yielding locking bow (1) known per se are attached to the proper shortish spiral neck (2) in such a manner that a point portion (1') of the locking bow (1) is shaped so as to correspond to the shape of the spiral neck (2) so that the point portion (1') at the final stage of the locking step is tightly attached to the shape of the spiral neck (2) under the pressing of the resilient locking bow (1), whereby during the proper locking step and while pressing the locking bow (1) between fingers to a contracted position, the point portion (1') of the locking bow (1) is displaced past the outer periphery of the connection ring (3) behind it, so that when the pressing is stopped, the locking bow (1) is opened due to its resilience and the locking spiral (1') of the locking bow (1) is pressed tightly against the spiral neck (2) to a locking position, the spiral attachment preventing the free movement of the locking bow (1) in the longitudinal direction of the clasp, simultaneously as the locking point (1') partly covers the open joint of the connection ring (3) and a tip (1") remains within the connection ring (3) to be protected from catching, which locking provides such a security that the locking bow (1) has to be pressed between fingers into a contracted shape in order to release it from the locking position, so that the locking bow (1) is detached from the spiral neck (2) and the locking point (1') is displaceable from within the connection ring (3) around the body thereof to the opposite side.

2. A multi-purpose clasp according to claim 1, characterized in that the connection ring (3) is shaped by bending so that the body ends in a bent end portion (3") tangent to the periphery of the ring (3) within it, forming a parallel connection in place of the conventional open-joint connection of the ring, which parallel connection has to be opened during the attachment of a closed-ring chain to the connection ring (3), whereafter it is closed due to the resilience of the connection ring, the tip (1") of the locking point (1') of which clasp is made hook-shaped by bending, and that at the same time as the tip (1") of the locking bow (1) is snapped within the bent end portion (3") of the connection ring (3) to be protected from catching, the connection ring (3) is locked so that, being resilient it is not opened by the pulling strain exerted thereon, and secures the locking of the locking bow (1), the releasing of which lockings requires that the locking bow is pressed between fingers so that it contracts and the body is simultaneously bent so that the tip (1") is detached from within the bent end portion (3") of the connection ring (3) and springs out, whereafter the opening stages of the locking bow (1) are completed.

3. A multi-purpose clasp according to claim 1 or 2, characterized in that the parallel connection between the connection ring (3) of the clasp and the bent end portion (3") defines a connection opening (3'), so that a closed-ring chain of a relatively great thickness can be connected to the connection ring (3) of the clasp even in cases where the ring yields only a little due to its small size or rigid material, the detachment of the clasp from the chain being prevented by means of the hook-shaped locking point (1'), which closes the connection opening transversally during the locking.

* * * * *